(12) United States Patent
Wilhour (10) Patent No.: US 10,364,028 B1
(45) Date of Patent: Jul. 30, 2019

(54) FLIGHT SYSTEM FOR HUMANS

(71) Applicant: Joshua C. Wilhour, Wasilla, AK (US)

(72) Inventor: Joshua C. Wilhour, Wasilla, AK (US)

(*) Notice: Subject to any disclaimer, the term of this patent is extended or adjusted under 35 U.S.C. 154(b) by 367 days.

(21) Appl. No.: 15/420,582

(22) Filed: Jan. 31, 2017

(51) Int. Cl.
  *B64C 39/02* (2006.01)
  *B64C 27/00* (2006.01)

(52) U.S. Cl.
  CPC ........... *B64C 39/026* (2013.01); *B64C 27/00* (2013.01)

(58) Field of Classification Search
  CPC ................................................. B64C 39/026
  See application file for complete search history.

(56) References Cited

U.S. PATENT DOCUMENTS

| | | | | |
|---|---|---|---|---|
| 3,039,718 A * | 6/1962 | Bohr | ..................... | B64C 39/026 244/4 A |
| 8,336,805 B1 * | 12/2012 | Zapata | .................. | B64C 39/026 114/315 |
| 8,695,916 B2 * | 4/2014 | Martin | .................. | B64C 39/026 244/4 A |
| 2009/0020654 A1 * | 1/2009 | Tyler | ..................... | B64C 39/026 244/23 A |
| 2015/0064004 A1 * | 3/2015 | Contoret | .................. | A63C 5/11 416/1 |

FOREIGN PATENT DOCUMENTS

FR  2793211 A1 * 11/2000  ........... B64C 39/026

* cited by examiner

*Primary Examiner* — Brian M O'Hara
(74) *Attorney, Agent, or Firm* — Michael J. Tavella (57) ABSTRACT

A lightweight body suit on which a number of high power fan motors are installed. In addition a pair of motors are attached to the user's arms and legs. The combination of fan motors allows adequate lift and the units mounted on the arms and legs allow for controlled flight. The suit also contains a small chest frame for holding batteries and for the protection of the user. In addition, elbow and knee protection are provided. Throttles are provided to control the speed of the motors.

11 Claims, 11 Drawing Sheets

FLIGHT SYSTEM FOR HUMANS

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to flight systems and particularly to flight systems for humans.

2. Description of the Prior Art

Ever since humans achieved the ability to leave the earth using balloons, humans have dreamed of solo flight without needing an aircraft. Over the years, many designs for flying have been developed. U.S. Pat. No. 3,023,980 teaches a turbofan lift device that propels a person above the ground for a limited amount of time. This device is a large frame device with a center fan and two downward pointing ducts that are used to propel a person vertically into the air. This device is heavy and cumbersome. U.S. Pat. No. 3,149,978 teaches a smaller "jet pack" style unit that attaches to the user's back and is controlled by arms extending forward. This device also comes with a glider attachment for additional protection of the user. Although smaller than the previous design, this device requires some type of combustion unit (in this case, a fuel powered pump). U.S. Pat. No. 3,150,847 teaches another "jet pack" device that is smaller yet. Although smaller, it still requires fuel. The small size limits the amount of time the device can operate. It also puts a limit as to the size of the person using it. It also uses a parachute as a safety measure. U.S. Pat. No. 3,570,785 teaches a pack for use with space suits. It has a frame with two propulsion nozzles, a fuel tank and control arms. Although this is a highly specialized form of "jet pack" it is designed to be used with hydrogen peroxide as a propellant, rather than a fuel that burns in an oxygen atmosphere. U.S. Pat. No. 4,253,625 teaches a wearable aircraft frame. This device has a pair of wings with an engine mounted on top of the wings. It also has a T-bar extending out rearwards to suspend the user's feet. Two control arms extend forward. The device is strapped to a user and, in a reclining position, the user can "fly" while wearing the device. U.S. Pat. No. 7,182,295 teaches a device that uses electric energy using large capacitive plates to allow a user to fly. This device has a vertical frame in which a user stands. It has a waste bar that controls. U. S. Publication No. 2011/0226895 teaches a large bat wing that is strapped to a user. The bat wing has no direct propulsion but is used as a glider. Finally, U. S. Publication No. 2014/0014766 is another wearable aircraft frame. This device looks like a small airplane. It has a propeller at the rear, horizontal and vertical stabilizers, a rudder, wings and landing gear. It also has a hatch in which a person can enter the airframe. The user lies in the airframe and is secured inside it. Controls are provided as well.

All of the above devices utilize frames of some sort-some large and some small-onto which the user and the propulsion means are attached. Flight is often limited to the amount of liquid fuel that can be carried. In the case of the larger airframes, flight is limited to more conventional routes and are not particularity suitable for emergency rescues, for example.

BRIEF DESCRIPTION OF THE INVENTION

The instant invention solves these problems. It is a lightweight body suit on which a number of high power ducted fan motors are installed. In addition a pair of motors are attached to each of the user's arms and a second pair on each of the user's legs. The combination of fan motors allows adequate lift and the units mounted on the arms and legs allow for controlled flight. The suit also contains a small chest frame for holding batteries and for the protection of the user. In addition, elbow and knee protection are provided.

In this way, emergency crews can fly to an injured hiker or climber or accident victim in rough terrain. Once there, the user can secure a rope line and provide first aid to the victim(s) while other rescuers safely reach them. In addition, a firefighter can quickly ascend to an upper level of a blazing building to anchor the top level of the blaze. Again, once safety lines are deployed, other firefighters can access the higher levels safely.

DETAILED DESCRIPTION OF THE INVENTION

Figure 1:
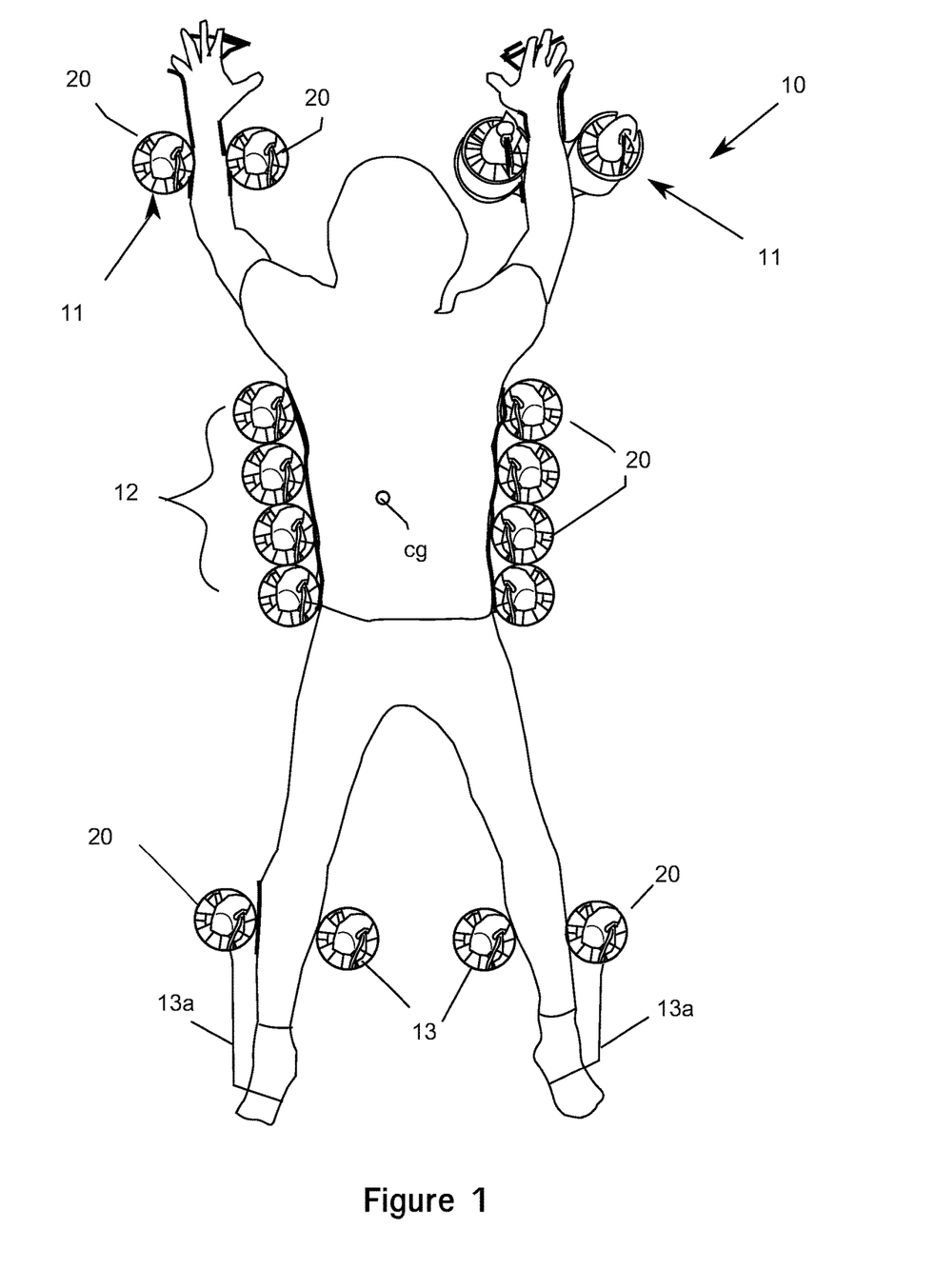
FIG. 1 is a top view of a user with the invention installed to show fan placement.

FIG. 1 is a top view of a user showing the preferred placement of the fan motors. This view does not show all of the details of the support frames, etc. Here, a user 100 is shown with the invention 10 installed. The invention 10 consists of several parts. First, there are two arm modules 11. Second, there is a torso portion 12. Third are two leg modules 13. Note that the placement of these modules focuses on the users center of gravity CG. These different modules are discussed below. Note that the placement of the leg modules 13 is important. In the preferred embodiment, they are placed below the user's knees. This allows the user the flex the knees to change the center of gravity, as well as being able to adjust the position of the fans for flight control. Note too, in the preferred embodiment, the leg modules 13 have ties 13a to the user's feet that also allow for additional flight control.

Figure 2:
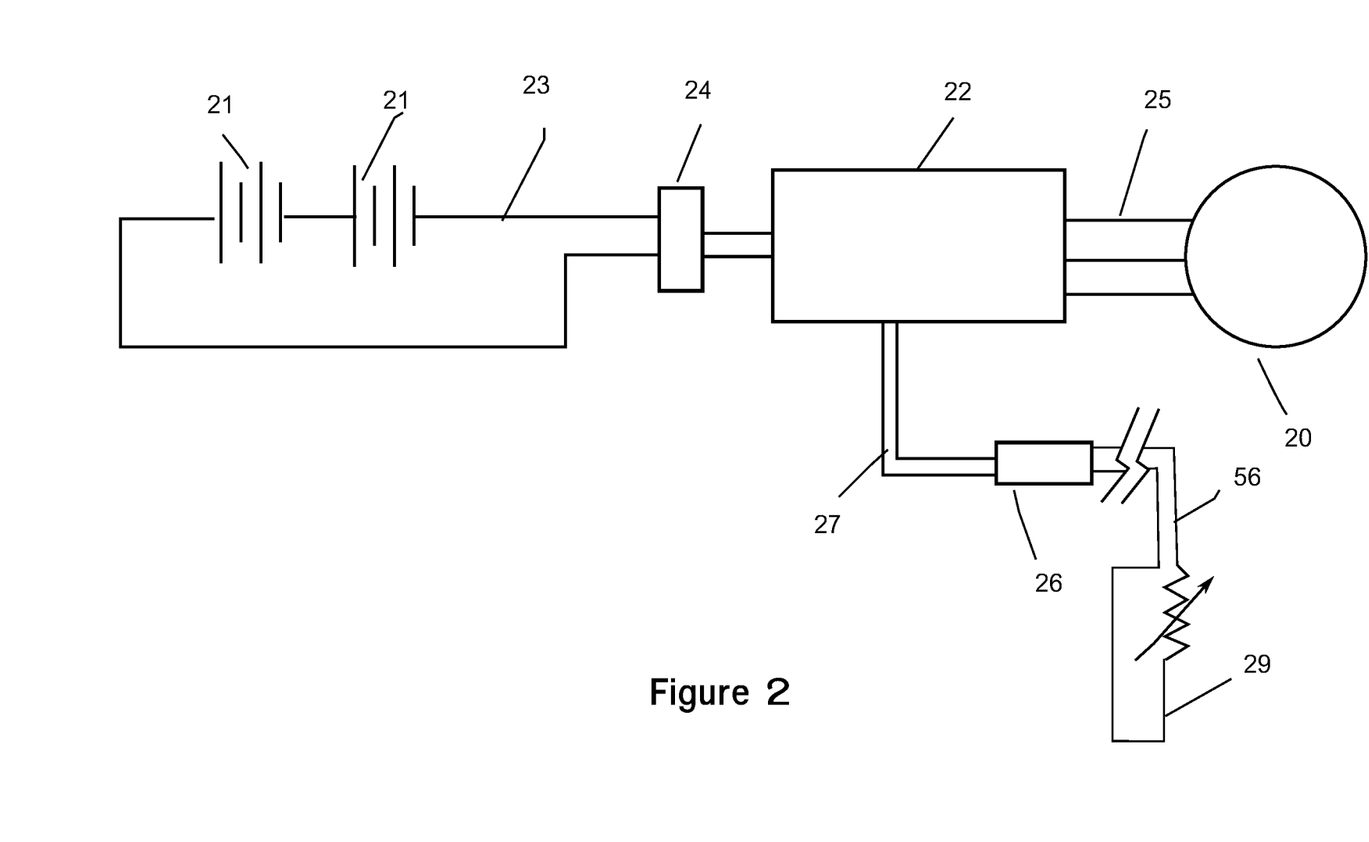
FIG. 2 is a schematic block diagram of the circuit for one of the fan motors used in the invention.

FIG. 2 is a schematic block diagram of the circuit for one of the fan motors used in the invention. As discussed above, there are different modules used in the invention 10. Each of the modules is built around fan motors 20. FIG. 2 shows the preferred circuity for one of the fan motors. Each of the fan motors 20 (note that, for example, the arm modules each have two fan motors 20, as discussed below) is powered by two lithium polymer (Li—Po) batteries 21. In the preferred embodiment, each battery is a type 6s, which is equal to 25.2 v DC. The batteries are connected in series, providing a total voltage of 50.4 v DC. Each fan motor is rated at an input voltage of 12 s (i. e., 12 cells wired in series) Each fan motor has a running current of 120a and a maximum thrust of 8 kg. The batteries are connected to a speed controller 22 by wires 23 and connectors 24. The speed controller takes the battery power and converts it to 3-phase digital 120 A output. This is then connected to the motor 20 by cables 25. A regulator 26 is used to control the output of the speed controller. It provides an output of pulse width modulation into the speed controller 22. Note that one speed controller is required for each motor. A potentiometer 29 is connected to the regulator to adjust the output to provide throttle control for the fan motors, as discussed below. The potentiometer is positioned apart from the regulator using wires 56 to allow for operator control as discussed below.

Figure 2A:
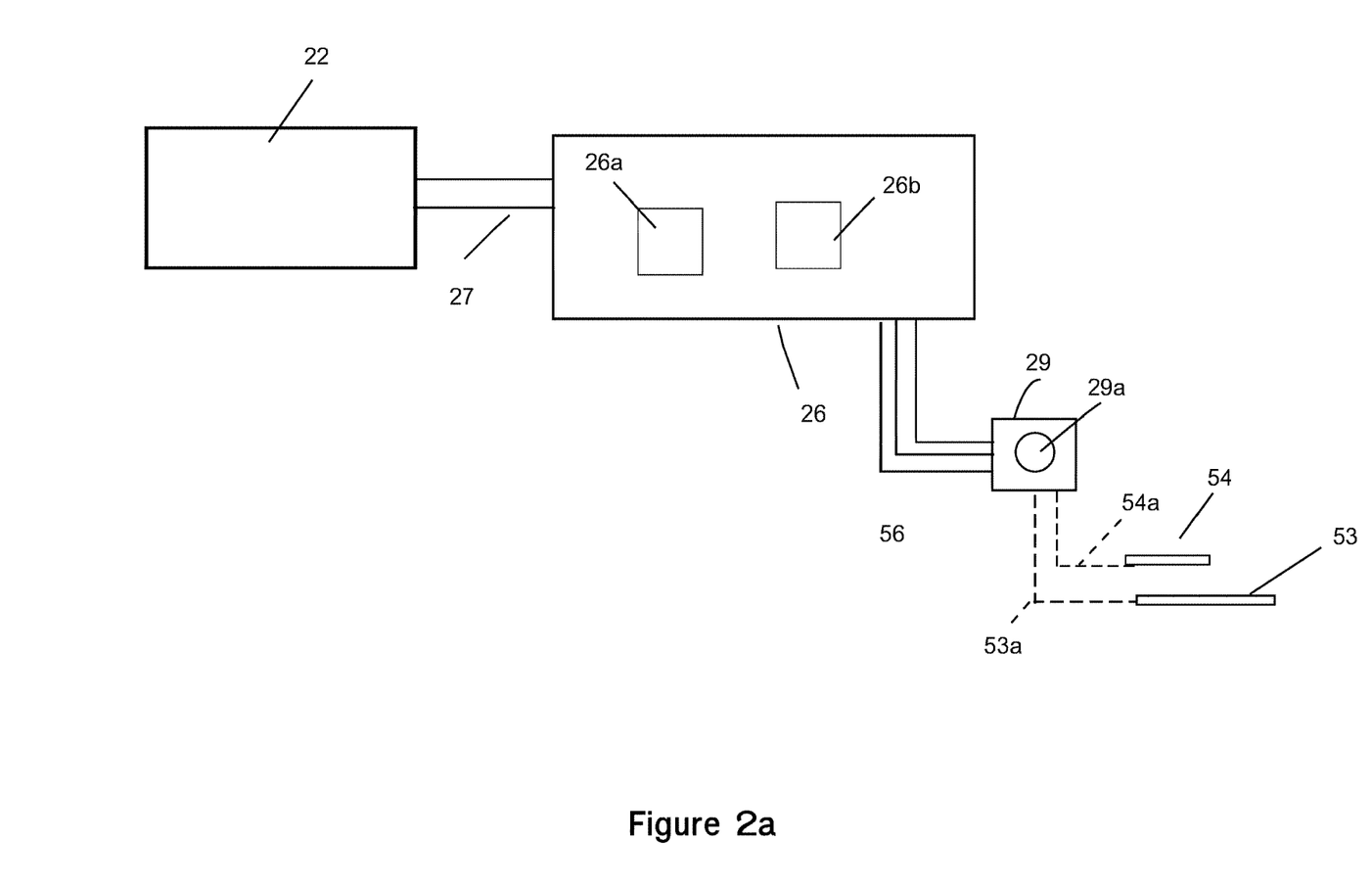
FIG. 2a is a schematic block diagram of the circuit for a regulator.

FIG. 2a is a schematic block diagram of the circuit for a regulator. In this figure, the speed controller 22 is shown connected to the regulator 26 by leads 27. The regulator consists of an analog to digital converter 26a and a pulse generator 26b. The output of the pulse generator 26b is controlled by a potentiometer 29. As discussed below, throttle levers 53 and 54 are shown with a potentiometer 29. Note the links 53a and 54a are representative of the mechanical connections that the levers make with the actual body of potentiometers (see FIG. 11). The potentiometer 29 has a rotating disk 29a that operates the potentiometer in the normal way. Output leads 56 lead to the regulators and connect with the internal regulator circuits to control the pulse width and therefore, the motor speed.

Figure 3:
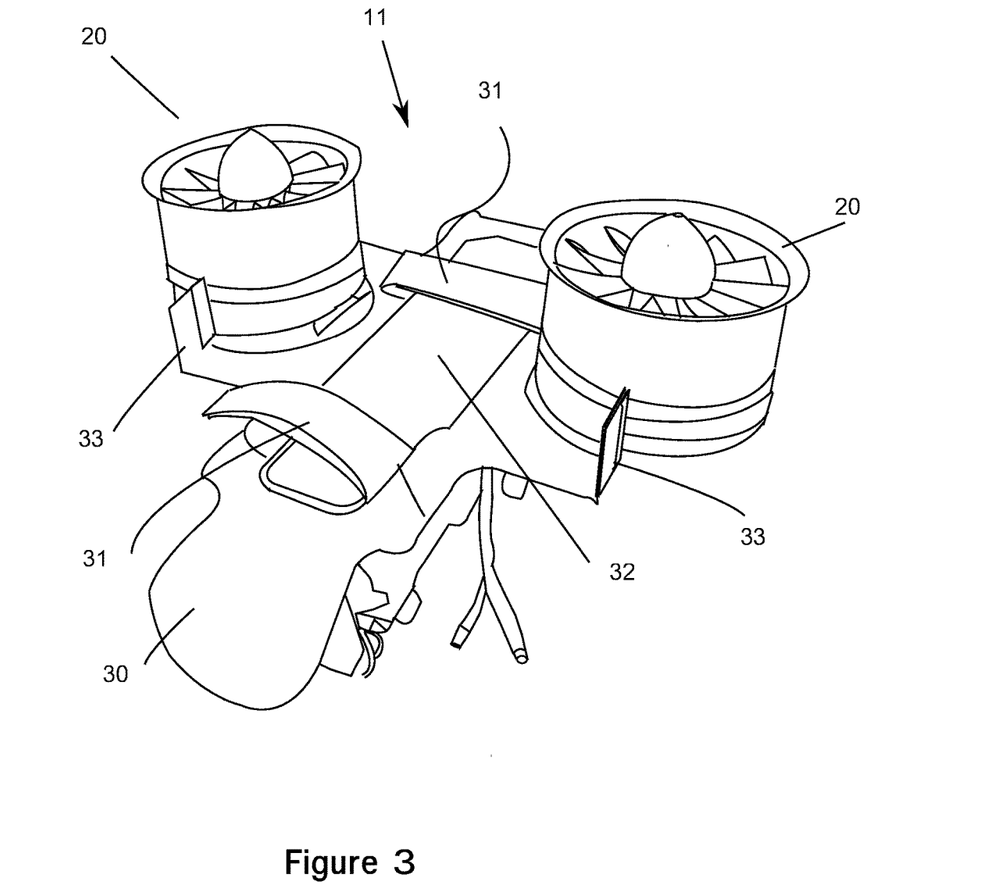
FIG. 3 is a top perspective view of one of the two arm modules of the invention.
Figure 4:
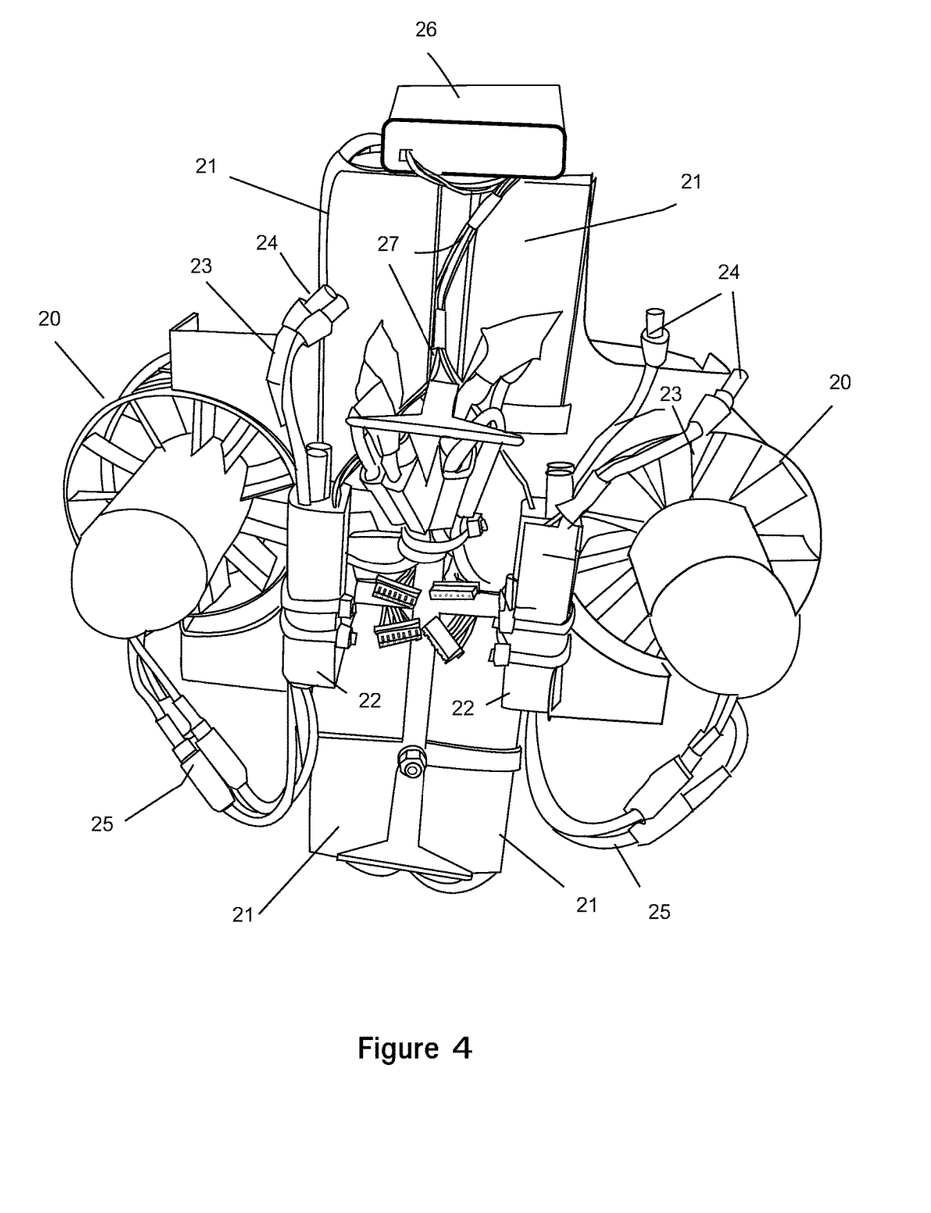
FIG. 4 is a bottom perspective view of one of the two arm modules of the invention.

FIG. 3 is a top perspective view of one of the two arm modules 11 of the invention. FIG. 4 is a bottom perspective view of one of the two arm control units 11 of the invention. These arm modules are the controls for the invention. As discussed below, one hand operates the forward control and the other operates the rearward control. As shown in FIG. 3, each arm module has a frame/support structure 30, onto which mount the fan motors 20, the batteries 21, the regulators 26 and the speed controller 22, which are shown on FIG. 4.

The frame 30 has straps 31 to secure the module to the user's arm. These straps can be any type of lightweight strap that uses clips, or hook and loop type fasteners to secure them. In the preferred embodiment, a pad 32 is placed as shown to cushion the user's arm. In these figures, the frame 30 is shown as being flat. Of course, the arm portion of the frame can be shaped to conform to a human arm. However, it is important that the fan motors 20 remain in a generally horizontal configuration (except as noted below). The frame 30 has attachment points 33 for securing the fan motors 20 to the frame. FIG. 4 shows how the fan motors extend below the upper surface of the frame 30. As discussed below, the frame 30 has a grip that allows the user's hand to operate the controls. Steering is accomplished by a slight turning or flexing of the user's arms (and/or legs), as discussed below.

FIG. 4 shows details of the device. Note, the cables 23 running from the speed controllers 22 (there are two speed controllers shown-one for each fan motor). In the figure, these are not connected to the batteries 21 (again two per fan motor) for safety reasons. The fan motors are connected to the speed controllers by cables 25 as shown. Note the regulator 26 is connected to the speed controllers 22 by wires 27. This figure also shows a number of connectors 28 that are used for charging the batteries.

Figure 5:
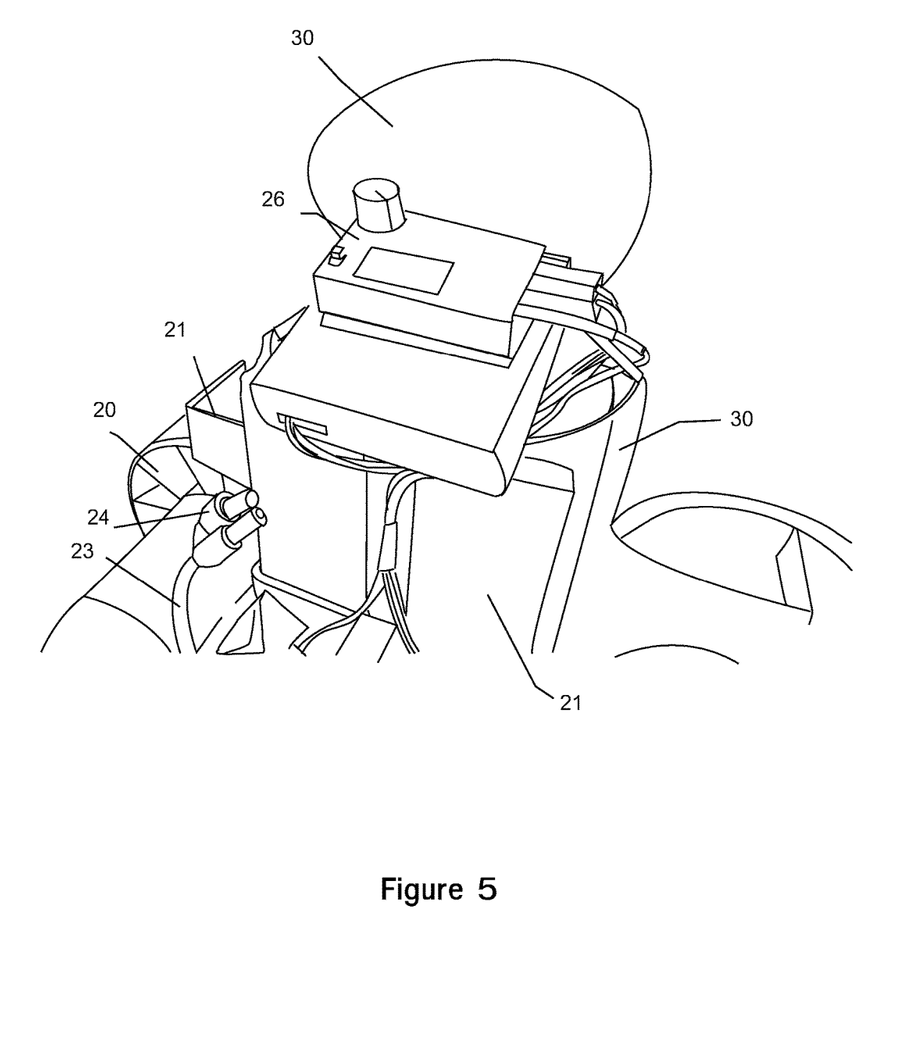
FIG. 5 is a detail view of the regulator of the invention.

FIG. 5 is a detail view of the regulator of the invention. In this view, the regulator 26 is shown. As discussed above, the regulator connects to the speed controllers 22. The regulator regulates the output of the speed controllers using pulse width modulation. One regulator is used for each speed controller. The regulator is an analog to digital converter that changes an input of 4-8 V DC to a stream of variable width pulses. The pulse width is adjustable by the potentiometer 29 (see, e. g., FIG. 9). By varying the pulse width, the user can control the speed of the fans, providing a throttle for the fans. As discussed below, the throttle is in the hand grip for the arm units' frame 30.

Figure 6:
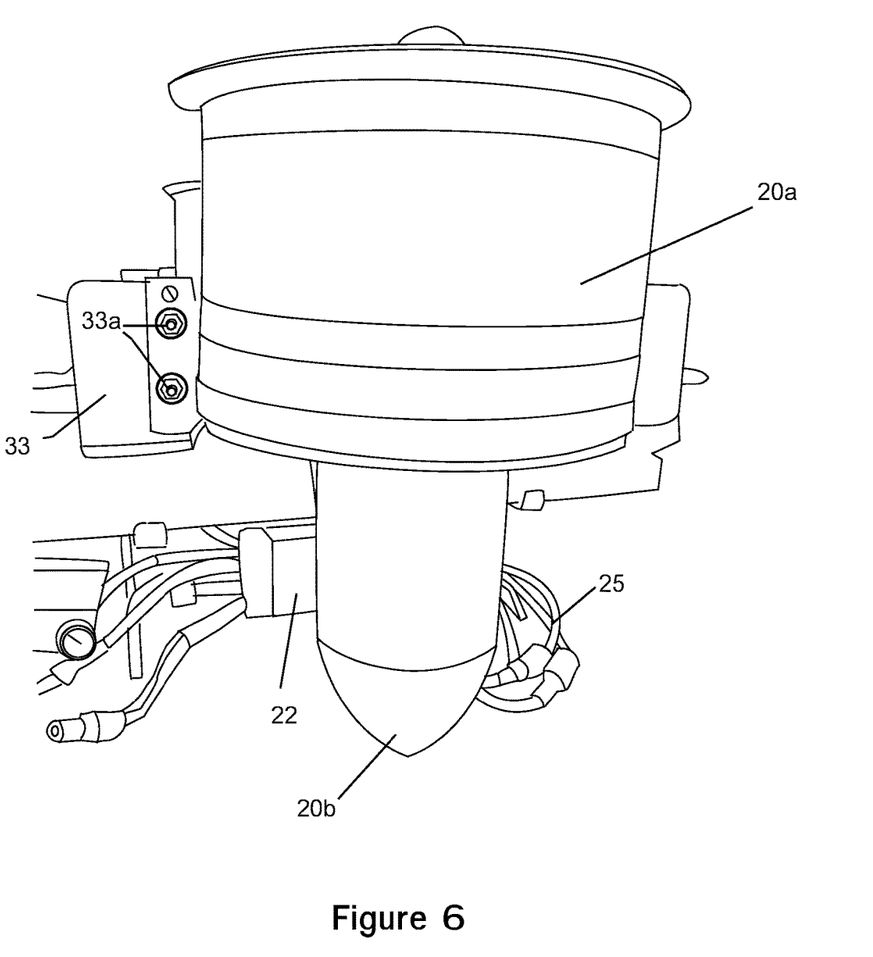
FIG. 6 is a side detail view of one of the fans of the invention.
Figure 7:
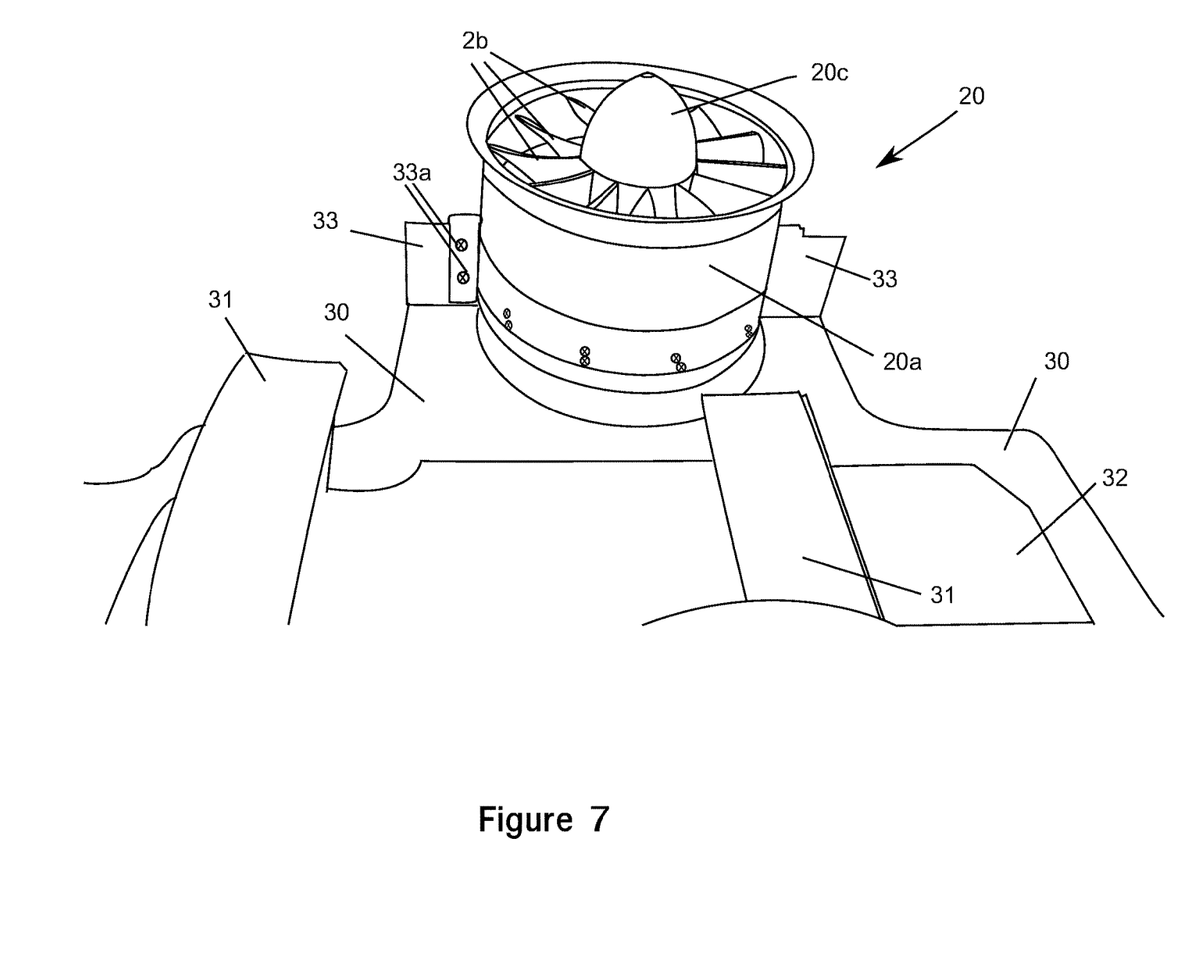
FIG. 7 is a perspective view of one of the ducted fans of the invention.

FIG. 6 is a side detail view of one of the fan motors 20 of the invention. In the preferred embodiment, the fan motors are ducted for safety and operational considerations. In the preferred embodiment, the fan motors are brush-less AC type. In this figure, the fan motor 20 is shown, the fan has an upper outer case 20a that is secured to the frame 30 by a bracket 33 and fasteners 33a. The actual motor portion 20b of the fan motor 20 extends downwardly below the upper outer case 20a as shown. Note the wires 25 that connect the speed controller 22 to the fan motor 20. FIG. 7 is a perspective view of a fan motor 20. In this figure, the frame 30 is shown with the fan motor 20 attached. Note the upper outer case 20a of the fan motor and the connection to the frame 30 using the bracket 33 and the fasteners 33a. Note in this view, the fan blades 20b that are connected to the motor shaft 20c that extends above the upper outer case 20a as shown. Note the pad 32 and straps 31 for reference.

Figure 8:
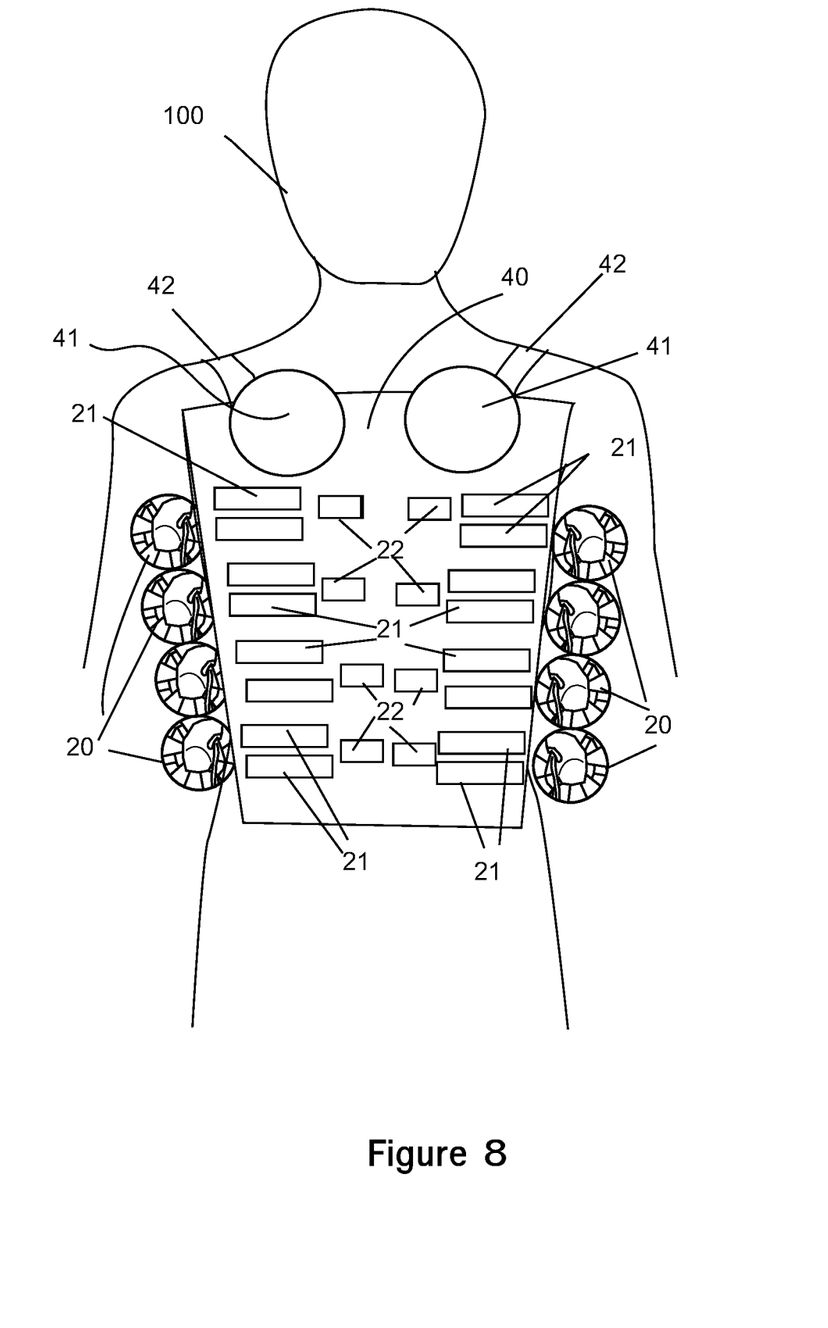
FIG. 8 is a detail view of the chest protector/battery holder of the invention.

FIG. 8 is a detail view of the chest protector/frame/battery holder of the invention. As shown in FIG. 1, the system has 8 fan motors lined along the user's torso (four on each side). To power and control these fan motors 20, the batteries 21 and speed controllers 22 are mounted to a chest plate 40 that also acts as a shield for the user 100. Note that the chest plate 40 includes two plates 41 that provide additional protection. The chest plate can be incorporated into a suit, such as that shown in FIG. 1, or, it can be attached to the user with straps 42 as suggested in FIG. 8. As shown, the chest plate 40 holds 16 batteries 21 (two per fan motors as shown in FIG. 2 and eight speed controllers 22 (one per fan motor, also shown in FIG. 2). Note that the regulators 26 for these fan motors are also attached as shown. As noted above, each regulator can control one speed controller. The regulator's output is controlled by potentiometers installed in the throttles as discussed below.

Figure 9:
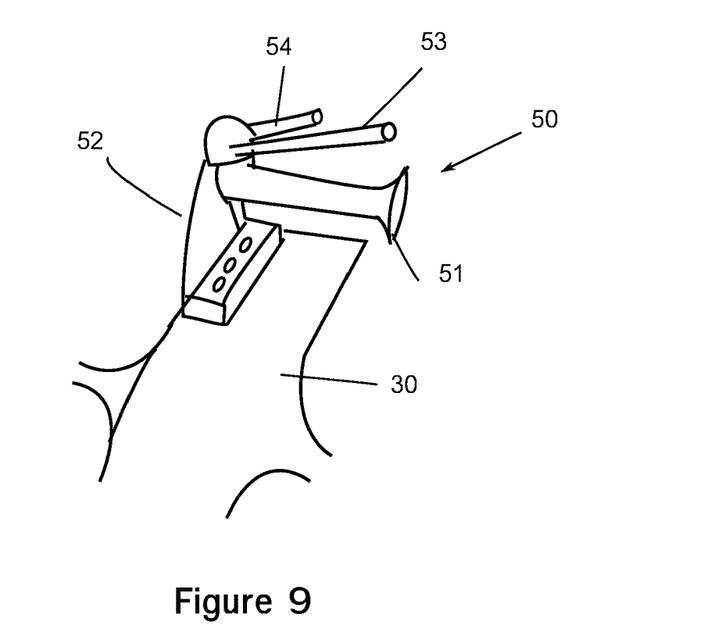
FIG. 9 is a detail view of the throttle mechanism for the left arm unit.

FIG. 9 is a detail view of the throttle mechanism for the left arm unit. In this view, the frame 30 is shown with a throttle 50. The throttle 50 consists of a hand grip 51 that is secured to the frame 30 by a bracket 52. The hand grip 51 has two throttle levers 53 and 54 as shown. The two throttle levers are pivotably attached to a set of potentiometers 29 (see FIGS. 10 and 11). The potentiometers control the DC pulse rate of the regulators to the motors, which controls the motor's speed. In the preferred embodiment, there are two throttle levers. The first lever 53 controls the speed up to about 80 percent of maximum. The second lever 54 controls the last 20 percent of the speed, up to maximum. Note that the right arm unit has a similar throttle configuration.

Figure 10:
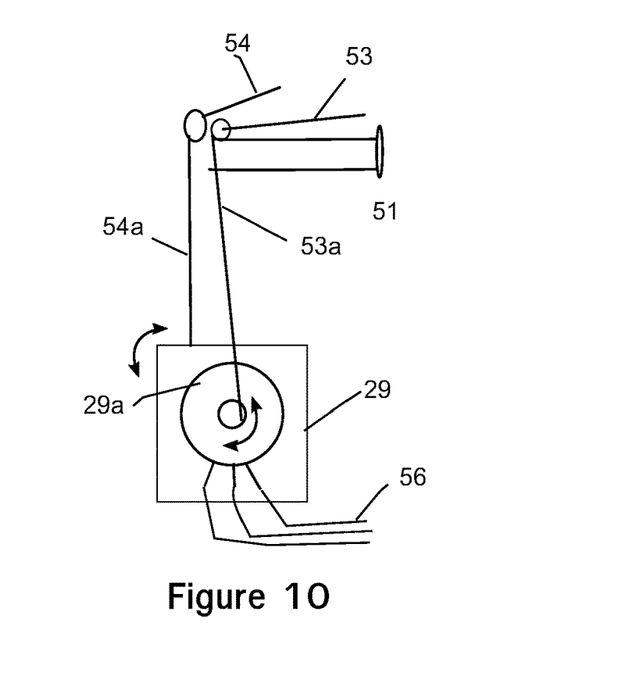
FIG. 10 is a diagrammatic view of a throttle and the potentiometer control.

FIG. 10 is a diagrammatic view of a throttle and the potentiometer control. Here, the hand grip 51 and throttle levers 53 and 54 are shown with a potentiometer 29. Note the links 53*a* and 54*a* are representative of the mechanical connections that the levers make with the actual body of potentiometers (see FIG. 11). The potentiometer 29 has a rotating disk 29*a* that operates the potentiometer in the normal way. Output leads 56 lead to the regulators as discussed above in the details of FIG. 2*a*.

Figure 11:
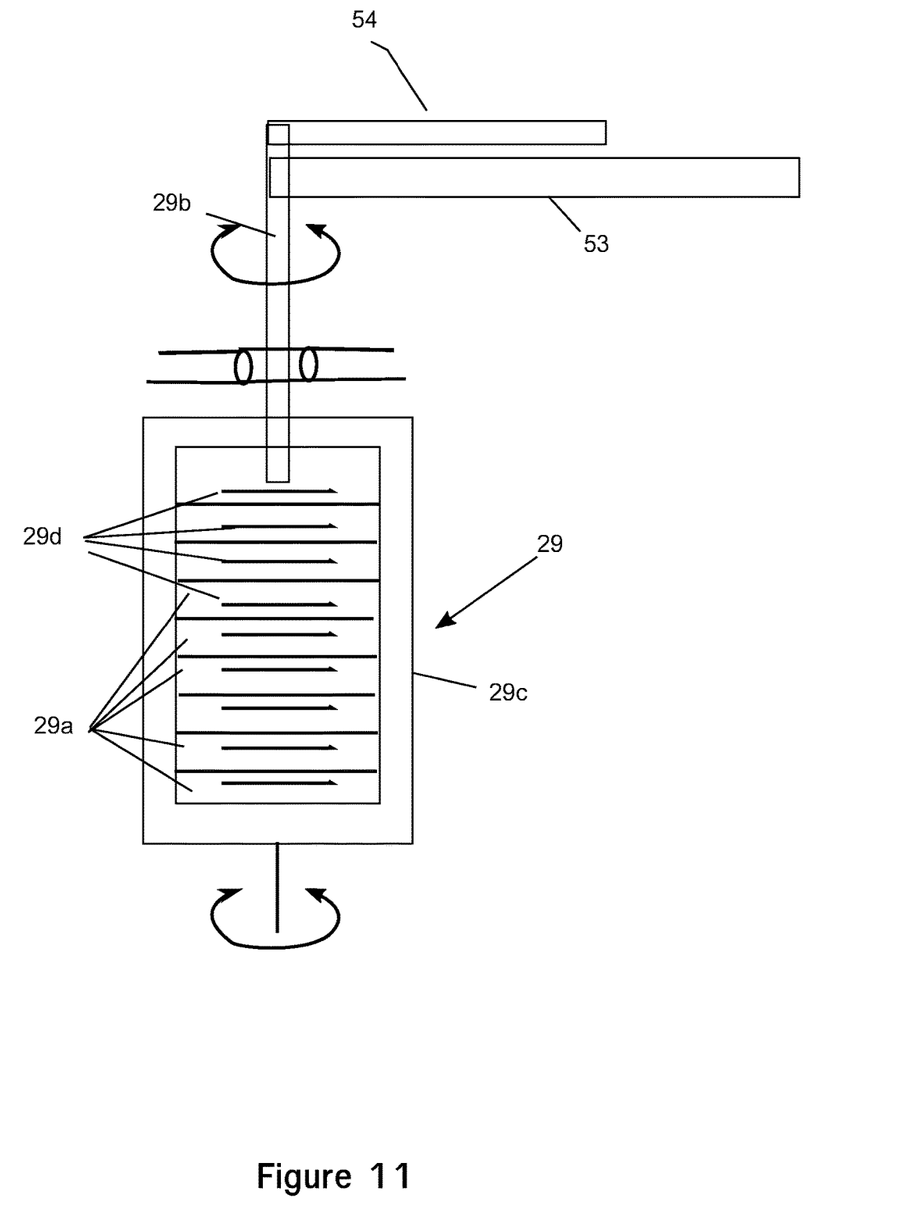
FIG. 11 is a diagrammatic view of the throttle attached to a eight-gang potentiometer control.

FIG. 11 is a diagrammatic view of the throttle attached to a eight-gang potentiometer control. As discussed above, one regulator is used to control a speed controller. Thus, in the case of the arm modules, where two fans are used, or for the torso where eight fans are used, the need for regulators increases. The throttle can control the output of all of these regulators by using a ganged potentiometer 29. Note that the throttle levers 53 and 54 are connected to a shaft 29*b* that attaches to a series of wiper arms 29*d* that mover on the disks 29*a* to adjust the potentiometer's resistance. The wiper arms and disks are housed in a housing 29*c*. Note that the potentiometer housing, wiper arms and disks are shown enlarged for convenience. In reality, the potentiometer are much smaller than that shown.

In the preferred embodiment, the left hand throttle controls the arms and upper torso and the right hand throttle controls the legs and the lower torso. Of course, the throttle can be set for any configuration desired by the user.

The placement of the fans provides many advantages. Variable geometry of the user allows for the ability to shift the center of gravity, which produces different flight characteristics. For example, the arms and legs can be twisted to obtain vector thrust in a particular direction. The variable geometry also allows for safe operation in the event of an engine failure.

Finally, the placement of the units keeps the user's back open for a parachute as an additional safety factor.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A flight system for humans comprising:
   a) a first arm module configured to be attached to a user's right arm;
   b) a second arm module configured to be attached to said user's left arm;
   c) a torso portion, configured to be attached to said user's torso;
   d) a first leg module configured to be attached to said user's right leg; and
   e) a second leg module configured to be attached to said user's left leg;
   f) wherein said arm modules, torso portion and leg modules each are comprised of:
      i) a plurality of fan motors secured to a frame;
      ii) a plurality of batteries in electrical communication with said plurality of fan motors;
      iii) a plurality of speed controllers in electrical communication with said plurality of fan motors; and
      iv) a plurality of regulators in electrical communication with said plurality of speed controllers.

2. The flight system for humans of claim 1 wherein each leg module comprises:
   a) two fan motors attached to said frame;
   b) at least one battery for each of said fan motors, being attached to said frame;
   c) two speed controllers for said two fan motors, attached to said frame and being in electrical communication with said at least one battery and said two fan motors;
   d) two regulators, attached to said frame and being in electrical communication with said two speed controllers; and
   e) an attachment mechanism configured for attaching said frame to the leg of said user.

3. The flight system for humans of claim 1 wherein each arm module comprises:
   a) two fan motors attached to said frame;
   b) at least one battery for each of said fan motors, being attached to said frame;
   c) two speed controllers for said two fan motors, attached to said frame and being in electrical communication with said at least one battery and said two fan motors;
   d) two regulators, attached to said frame and being in electrical communication with said two speed controllers; and
   e) an attachment mechanism configured for attaching said frame to the arm of said user.

4. The flight system for humans of claim 3 wherein each of said arm modules further comprises a throttle attached to said frame for controlling the speed of said two fan motors.

5. The flight system for humans of claim 4 wherein each of said throttles comprise:
   a) one potentiometer for each of said two regulators, said potentiometers being ganged on a rotational member and being secured to said arm module;
   b) a throttle arm, mechanically connected to said rotational member, for turning said ganged potentiometers; and
   c) connecting leads from said ganged potentiometers to said two regulators, whereby each potentiometer is electrically connected to one of said two regulators.

6. The flight system for humans of claim 5 wherein each of said throttles further comprise a second throttle arm mechanically connected to said rotational member, for turning said ganged potentiometers.

7. The flight system for humans of claim 6 wherein the first throttle arm is set to provide up to 80 percent of maximum throttle output and the second throttle arm is set to provide from 80 to 100 percent of the maximum throttle output.

8. The flight system for humans of claim 1 wherein each of said plurality of regulators contains an analog to digital converter and a pulse width generator.

9. The flight system for humans of claim 8 further including a throttle comprising:
   a) one potentiometer for each of said plurality of regulators, said potentiometers being ganged on a rotational member and being secured to one of said arm modules;
   b) a throttle arm, mechanically connected to said rotational member, for turning said ganged potentiometers; and
   c) connecting leads from said ganged potentiometers to said plurality of regulators, whereby each potentiometer is electrically connected to one of said plurality of regulators.

10. The flight system for humans of claim 9 wherein said potentiometers control the width pulses being generated by the pulse width generator.

11. The flight system for humans of claim 10 wherein each of said plurality of regulators converts an input of between 4 and 8 V DC to a stream of variable width pulses.

* * * * *